US012671950B2

(12) United States Patent
Mouzakis et al.

(10) Patent No.: US 12,671,950 B2
(45) Date of Patent: Jun. 30, 2026

(54) IMPULSE RESPONSE DELAY ESTIMATION

(71) Applicant: Garmin International, Inc., Olathe, KS (US)

(72) Inventors: Constantine Mouzakis, Phoenix, AZ (US); Nicholas C. Ames, Tempe, AZ (US)

(73) Assignee: Garmin International, Inc., Olathe, KS (US)

( * ) Notice: Subject to any disclaimer, the term of this patent is extended or adjusted under 35 U.S.C. 154(b) by 246 days.

(21) Appl. No.: 18/545,385

(22) Filed: Dec. 19, 2023

(65) Prior Publication Data

US 2024/0223983 A1 Jul. 4, 2024

Related U.S. Application Data

(60) Provisional application No. 63/478,260, filed on Jan. 3, 2023.

(51) Int. Cl.
*H04S 7/00* (2006.01)
*H04R 5/04* (2006.01)

(52) U.S. Cl.
CPC ............... *H04S 7/301* (2013.01); *H04R 5/04* (2013.01)

(58) Field of Classification Search
CPC .......... H04S 7/301; H04R 5/04; H04R 29/001
See application file for complete search history.

(56) References Cited

U.S. PATENT DOCUMENTS 7,949,140 B2 5/2011 Kino
8,111,831 B2 2/2012 Asada et al.
8,144,882 B2 3/2012 Christoph et al.
8,150,065 B2 4/2012 Solbach et al.
8,175,284 B2 5/2012 Goldberg et al.
9,462,383 B2 10/2016 Okimoto et al.
10,104,470 B2 10/2018 Kon
10,375,500 B2 8/2019 Hashimoto et al.
10,529,347 B2 1/2020 Truman et al.
11,074,925 B2 7/2021 Bryan
11,178,503 B2 * 11/2021 Mehta ........................ H04S 7/30
11,337,017 B2 5/2022 Sheen
11,800,309 B2 * 10/2023 Brännmark .......... H04R 29/001
2005/0157891 A1 7/2005 Johansen
(Continued)

FOREIGN PATENT DOCUMENTS

WO 2009008068 A1 1/2009
WO 2020008889 A1 1/2020
(Continued)

OTHER PUBLICATIONS

Lubin, Tom et al, Impulse Alignment of Loudspeakers and Microphones, published prior to Dec. 19, 2023.

*Primary Examiner* — Paul W Huber

(74) *Attorney, Agent, or Firm* — Samuel M. Korte; Max M. Ali; Kathleen D. Fitterling

(57) ABSTRACT

A method for delay estimation of audio signals using an impulse response signal is provided. The method includes determining an energy envelope for the impulse response signal based on a moving average function of the impulse response signal. The method further includes determining an estimated delay of the impulse response signal based on at least one characteristic of the determined energy envelope. At least one audio signal phase is adjusted for at least one audio driver based on the estimated delay.

9 Claims, 8 Drawing Sheets

(56) References Cited

U.S. PATENT DOCUMENTS

| | | | | |
|---|---|---|---|---|
| 2005/0169488 | A1 | 8/2005 | Kato et al. | |
| 2005/0244012 | A1* | 11/2005 | Asada | H04S 7/301 381/98 |
| 2007/0086597 | A1* | 4/2007 | Kino | H04S 7/301 381/59 |
| 2009/0161879 | A1* | 6/2009 | Yanagawa | H04S 1/002 381/17 |
| 2015/0139430 | A1* | 5/2015 | Miyata | H04R 29/00 381/56 |
| 2016/0080887 | A1* | 3/2016 | Tikkanen | H04S 7/40 381/303 |
| 2018/0122396 | A1* | 5/2018 | Lee | H04R 5/04 |
| 2021/0258714 | A1 | 8/2021 | Watanabe et al. | |
| 2022/0030373 | A1* | 1/2022 | Mehta | H04S 7/30 |
| 2022/0240040 | A1* | 7/2022 | Zheng | H04R 5/04 |
| 2024/0223949 | A1 | 7/2024 | Ames | |

FOREIGN PATENT DOCUMENTS

| | | | |
|---|---|---|---|
| WO | 2020175174 | A1 | 9/2020 |
| WO | 2020175175 | A2 | 9/2020 |

* cited by examiner

Parameters

The algorithm requires a set of user defined parameters, those are:

| | | |
|---|---|---|
| Averaging window size | WinLength | Devault = 128 |
| Averaging window overlap in % | Overlap | Default = 50% |
| Noise level threshold | Threshold | Default = 0.1 (-20db) |

IMPULSE RESPONSE DELAY ESTIMATION

CROSS-REFERENCE TO RELATED APPLICATION

This Application is related to and claims priority to U.S. Provisional Application No. 63/478,260, filed Jan. 3, 2023, entitled IMPULSE RESPONSE DELAY ESTIMATION, the entire contents of which is incorporated herein by reference.

TECHNICAL FIELD

This disclosure relates audio reproduction and in particular to a method and system for estimating (i.e., detecting and/or determining) impulse response delay in audio systems.

BACKGROUND

Existing audio systems, e.g., for home theaters, vehicles, boats, etc., may include multiple speakers and associated audio drivers, such as subwoofer speakers, midbass speakers, midrange speakers, high-range speakers (tweeters), main speakers, etc. These speakers and/or audio drivers may be physically separated in space. Each of these speakers and/or audio drivers may be configured to produce audio within a respective frequency spectrum.

Existing systems may be configured for aligning the timing and/or phase of these multiple speakers, so that the playback on the speakers is time-aligned and/or phase-aligned at the ear of the listener. Existing systems typically utilize impulse responses for this purpose.

Some existing systems perform a phase adjustment procedure which may include measuring the peak energy of each impulse response and using digital signal processing (DSP) delay to align the peaks so that these peaks occur roughly at the same point in time. This may be referred to as a "peak finder" technique. Existing peak finder techniques, however, may suffer from various drawbacks, e.g., when the audio drivers and/or speakers share a (frequency) spectral crossover.

For example, in some existing systems, delay finding methods use a peak amplitude based approach where the impulse response is acquired (e.g., by a microphone of a calibration device), and the system looks for the data point with the largest absolute amplitude. The time of peak amplitude is reported as measured "delay". This technique, however, only functions properly under certain limited conditions. For example, the measured speaker may require significant high-frequency energy, and the system may malfunction in the presence of room/environment-induced acoustic reflections which yield a larger peak amplitude than that of the direct energy from the speaker. Thus, using conventional delay finders for aligning spectral crossovers may not function accurately or properly, especially where there is crossover from the subwoofer and main system (e.g., in a studio setting), or where subwoofer/midbass crossovers occur (e.g., in active home or vehicle systems). Typically, this may result in inaccuracy of the measured delay values, which may be further compounded due to reflected energy in rooms, cars, etc.

Existing systems using peak impulse response alignment thus suffer from acoustic output being perceived (e.g., subjectively by a human listener) as degraded. Furthermore, existing systems may exhibit "seamlessness" in which the subwoofer "blends" with the main speakers (e.g., the midbass or other speakers). The magnitude response in dB and relative phase response in degrees are examples of objective mechanisms which may be used to assess whether an ideal alignment has been achieved.

Thus, existing systems may not be sufficient or accurate for adjusting the timing and/or phase relationship of two or more audio drivers and/or speakers.

SUMMARY

Some embodiments advantageously provide a method and system for estimating (i.e., detecting and/or determining) impulse response delay in audio systems. For example, in some embodiments, a start time of an impulse response output by a loudspeaker is detected, determined, and/or estimated based at least in part on a rise above a noise floor associated with the impulse response signal being at least a preconfigured portion of the signal envelope average, as described herein. Measuring a start time of an impulse response may yield more accurate estimations of phase characteristics and/or delay of the signal, and which may result in improved sound quality for audio systems, as compared to existing systems.

According to a first aspect of the present disclosure, a method in a calibration device for delay estimation of audio signals using an impulse response signal is provided. The method includes determining an energy envelope for the impulse response signal based on a moving average function of the impulse response signal, determining an estimated delay of the impulse response signal based on at least one characteristic of the determined energy envelope, and adjusting at least one audio signal phase for at least one audio driver based on the estimated delay.

According to one or more embodiments of this aspect, the at least one characteristic includes at least one of a peak value of the energy envelope, and a peak time at which the energy envelope first reaches the peak value.

According to one or more embodiments of this aspect, determining the estimated delay time includes determining a noise floor of the impulse response signal, determining a first time at which an amplitude of the impulse response signal rises to a threshold value above the noise floor, the threshold value being a predetermined fraction of the peak value of the energy envelope, and detecting a first inflection point of a derivative of the impulse response signal in a time period from the first time to the peak time, the estimated delay time being an amount of time from a start time to the detected first inflection point.

According to one or more embodiments of this aspect, the predetermined fraction is one-tenth.

According to one or more embodiments of this aspect, the method further includes generating a reference audio signal for playback on a loudspeaker, and measuring the playback of the loudspeaker to determine the impulse response, the start time being associated with the generating of the reference audio signal.

According to one or more embodiments of this aspect, the moving average function is based on a root mean squared function.

According to one or more embodiments of this aspect, the moving average function is further based on a raised cosine window.

According to another aspect of the present disclosure, a calibration device for delay estimation of audio signals using an impulse response signal is provided. The calibration device is configured to determine an energy envelope for the impulse response signal based on a moving average function of the impulse response signal, determine an estimated delay of the impulse response signal based on at least one characteristic of the determined energy envelope, and adjust at least one audio signal phase for at least one audio driver based on the estimated delay.

According to one or more embodiments of this aspect, the at least one characteristic includes at least one of a peak value of the energy envelope, and a peak time at which the energy envelope first reaches the peak value.

According to one or more embodiments of this aspect, calibration device is further configured to determine the estimated delay time by determining a noise floor of the impulse response signal, determining a first time at which an amplitude of the impulse response signal rises to a threshold value above the noise floor, the threshold value being a predetermined fraction of the peak value of the energy envelope, and detecting a first inflection point of a derivative of the impulse response signal in a time period from the first time to the peak time, the estimated delay time being an amount of time from a start time to the detected first inflection point.

According to one or more embodiments of this aspect, the predetermined fraction is one-tenth.

According to one or more embodiments of this aspect, the calibration device is further configured to generate a reference audio signal for playback on a loudspeaker, and measure the playback of the loudspeaker to determine the impulse response, the start time being associated with the generating of the reference audio signal.

According to one or more embodiments of this aspect, the moving average function is based on a root mean squared function.

According to one or more embodiments of this aspect, the moving average function is further based on a raised cosine window.

According to another aspect of the present disclosure, a system for delay estimation of audio signals is provided, where the system includes a calibration device, a receiver, a loudspeaker, and an audio driver. The calibration device is configured to generate a reference audio signal, and transmit the reference audio signal to the receiver. The receiver is configured to receive the reference audio signal, and transmit the reference audio signal to the audio driver for playback on the loudspeaker. The calibration device is further configured to measure the playback of the reference audio signal on the loudspeaker to determine the impulse response, determine an energy envelope for the impulse response signal based on a moving average function of the impulse response signal, determine an estimated delay of the impulse response signal based on at least one characteristic of the determined energy envelope, determine an adjusted audio signal phase based on the estimated delay, and transmit the adjusted audio signal phase to the receiver. The receiver is further configured to receive the adjusted audio signal phase from the calibration device, and adjust at least one additional audio signal for the audio driver based on the adjusted audio signal phase.

According to one or more embodiments of this aspect, the at least one characteristic includes at least one of a peak value of the energy envelope, and a peak time at which the energy envelope first reaches the peak value.

According to one or more embodiments of this aspect, the calibration device is configured to determine the estimated delay time by determining a noise floor of the impulse response signal, determining a first time at which an amplitude of the impulse response signal rises to a threshold value above the noise floor, the threshold value being a predetermined fraction of the peak value of the energy envelope, and detecting a first inflection point of a derivative of the impulse response signal in a time period from the first time to the peak time, the estimated delay time being an amount of time from a start time to the detected first inflection point.

According to one or more embodiments of this aspect, the predetermined fraction is one-tenth.

According to one or more embodiments of this aspect, the start time is associated with the generating of the reference audio signal.

According to one or more embodiments of this aspect, the moving average function is based on a root mean squared function.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
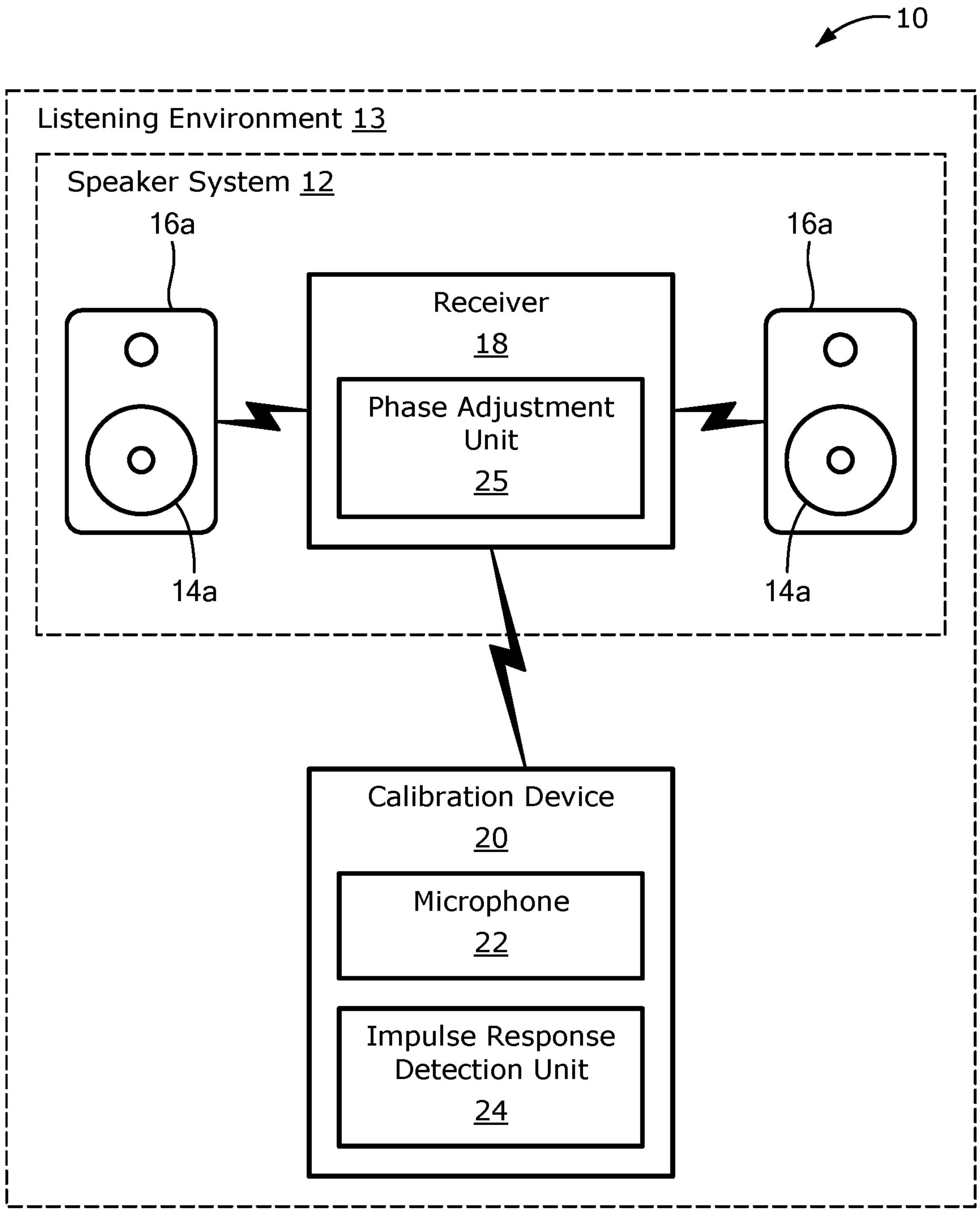
FIG. 1 is a diagram of an example system comprising a calibration device and a receiver according to principles disclosed herein.

Before describing in detail exemplary embodiments, it is noted that the embodiments reside primarily in combinations of apparatus components and processing steps related to estimating (i.e., detecting and/or determining) impulse response delay in audio systems. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to the drawing figures in which like reference designators refer to like elements there is shown in FIG. 1 a system designated generally as "10." System 10 may include a speaker system 12 located in a listening environment 13 (e.g., a professional theater, home theater, vehicle cabin, boat cabin, etc.), which includes a plurality of speakers 14*a*-14*n* (collectively, speakers 14) and a plurality of corresponding audio drivers 16*a*-16*n* (collectively, audio drivers 16). In some embodiments, the speakers 14 and audio drivers 16 are the same device, while in other embodiments, they may be separate devices, different modules within the same device, etc. Thus, as used herein, the term "speaker", "loudspeaker", and/or "audio driver" may be used interchangeably to refer to a speaker 14 and/or audio driver 16.

Speaker 12*a* may be a subwoofer associated with a first frequency spectrum, while speaker 12*b* may be associated with a second frequency spectrum, e.g., a midbass speaker. The first and second frequency spectra may be partially overlapping. Although only two speakers are shown in the example of FIG. 1, other speakers 14 (e.g., tweeters, midrange, etc.) may be used in speaker system 12, such that the phases/delays of each of the speakers 14 may be calibrated to match one another and/or a reference speaker 14.

Speaker system 12 may further include a receiver 18 which is configured to receive and/or generate audio signals from one or more sources (e.g., digital media storage, internet-based streaming audio/video service, another device such as a smartphone, a calibration device, etc.). Receiver 18 may transmit and/or receive analog and/or digital audio signals (and/or other signaling, such as data packets, audio channels, control signals, etc.) to/from speakers 14 and/or audio drivers 16, or any other entity of system 10, via a wired and/or wireless (e.g., Bluetooth, Wi-Fi, etc.) channel and/or connection. Each speaker 14 (and/or audio driver 16) may receive the audio signals from receiver 18 at slightly different timings, e.g., due to differences in the wired and/or wireless connections (e.g., cable length, channel interference, random noise, hardware capabilities, etc.). Receiver 18 may be configured to equalize audio signals and/or adjust the phases/timings of audio signals, e.g., according to a configuration received from another entity of system 10. Of note, although the invention is described with reference to a "receiver", this is done purely for the sake of convenience and to aid understanding. Implementations are not limited to receiver in the audio/visual sense of a device with an integrated preamplifier, source selection components and amplifiers. Rather, "receiver" as used herein refers to the component that is receiving or generating audio signals intended for reproduction. Non-limiting examples include audio/visual receivers in the traditional sense, preamplifiers, digital signal processors, integrated amplifiers, and other computing devices that process signals for audio reproduction.

System 10 further includes a calibration device 20, which may be configured to transmit and/or receive signaling (e.g., audio signals, data packets, control signals, etc.) to/from receiver 18, e.g., via a wired and/or wireless connection (e.g., Bluetooth, Wi-Fi, etc.). Calibration device 20 may be a computing device configured for processing audio signaling and determining phase delay adjustments in a speaker system 12, which may be specifically calibrated for listening environment 13 or a particular location (e.g., the driver's seat in a car) in listening environment 13. For example, calibration device 20 may be a portable computer, a stationary computer (e.g., desktop), a smartphone, a remote server, a cloud-based server, etc. In some embodiments, calibration device 20 may be integrated with receiver 18, while in other embodiments, calibration device 20 may be a separate device.

Calibration device 20 includes one or more microphones 22 for detecting audio output from speakers 14 and/or audio drivers 16. Calibration device 20 includes an impulse response detection unit 24 configured for detection of phase characteristics of impulse signals (e.g., detecting the start time of an impulse response produced by one or more speakers 14), as disclosed herein. For example, calibration device 20 may be configured to transmit (or indirectly cause transmission of, e.g., via an intermedia device and/or network) a configuration and/or control signaling to the receiver 18 for the receiver 18 to apply to one or more audio signals/channels for speakers 14 and/or audio drivers 16. For example, following a calibration procedure, as disclosed herein, calibration device 20 may transmit to receiver 18 configuration information which indicates one or more of a calibration metric, delay metric, phase/timing metric, etc., for receiver 18 to apply to one or more audio signals/channels, e.g., for adjusting the phase of one or more audio signals/channels to align the timing/phase of a plurality of speakers 14.

The receiver 18 may include a phase adjustment unit 25 configured for one or more receiver 18 functions described herein, such as with respect to phase/timing alignment of audio signals for speakers 14 and/or audio drivers 16 (e.g., based on configuration information received from calibration device 20), as disclosed herein.

Example implementations, in accordance with one or more embodiments, of calibration device 20 discussed in the preceding paragraphs will now be described with reference to FIG. 2.

The system 10 includes a calibration device 20 that includes hardware 26 enabling the calibration device 20 to communicate with one or more entities in system 10 and to perform one or more functions described herein. Hardware 26 includes one or more microphones 22, previously mentioned. The hardware 26 may include a communication interface 28 for setting up and maintaining at least a wired and/or wireless connection to one or more entities in system 10 such as receiver 18, speakers 14, audio drivers 16, other calibration devices 20, etc.

In the embodiment shown, the hardware 26 of the calibration device 20 further includes processing circuitry 30. The processing circuitry 30 may include a processor 32 and a memory 34. In particular, in addition to or instead of a processor, such as a central processing unit, and memory, the processing circuitry 30 may comprise integrated circuitry for processing and/or control, e.g., one or more processors and/or processor cores and/or field programmable gate arrays (FPGAs) and/or application specific integrated circuits (ASICs) adapted to execute instructions. The processor 32 may be configured to access (e.g., write to and/or read from) the memory 34, which may comprise any kind of volatile and/or nonvolatile memory, e.g., cache and/or buffer memory and/or random access memory (RAM) and/or read-only memory (ROM) and/or optical memory and/or erasable programmable read-only memory (EPROM).

The calibration device 20 further has software 36 stored internally in, for example, memory 34, or stored in external memory (e.g., database, storage array, network storage device, etc.) accessible by the calibration device 20 via an external connection. The software 36 may be executable by the processing circuitry 30. The processing circuitry 30 may be configured to control any of the methods and/or processes described herein and/or to cause such methods, and/or processes to be performed, e.g., by calibration device 20. Processor 32 corresponds to one or more processors 32 for performing calibration device 20 functions described herein. The memory 34 is configured to store data, programmatic software code and/or other information described herein. In some embodiments, the software 36 may include instructions that, when executed by the processor 32 and/or processing circuitry 30, causes the processor 32 and/or processing circuitry 30 to perform the processes described herein with respect to calibration device 20. For example, processing circuitry 30 of the calibration device 20 may include impulse response detection unit 24 which is configured to perform one or more calibration device 20 functions described herein such as with respect to detecting phase characteristics (e.g., detecting a start time) of an impulse response, as disclosed herein.

Example implementations, in accordance with one or more embodiments, of receiver 18 discussed in the preceding paragraphs will now be described with reference to FIG. 3.

The system 10 includes a receiver 18 that includes hardware 38 enabling the receiver 18 to communicate with one or more entities in system 10 and to perform one or more functions described herein. The hardware 38 may include a communication interface 40 for setting up and maintaining at least a wired and/or wireless connection to one or more entities in system 10 such as calibration device 20, speakers 14, audio drivers 16, other receivers 18, etc.

In the embodiment shown, the hardware 38 of the receiver 18 further includes processing circuitry 42. The processing circuitry 42 may include a processor 44 and a memory 46. In particular, in addition to or instead of a processor, such as a central processing unit, and memory, the processing circuitry 42 may comprise integrated circuitry for processing and/or control, e.g., one or more processors and/or processor cores and/or FPGAs and/or ASICs adapted to execute instructions. The processor 44 may be configured to access (e.g., write to and/or read from) the memory 46, which may comprise any kind of volatile and/or nonvolatile memory, e.g., cache and/or buffer memory and/or RAM and/or ROM and/or optical memory and/or EPROM.

The receiver 18 further has software 48 stored internally in, for example, memory 46, or stored in external memory (e.g., database, storage array, network storage device, etc.) accessible by the receiver 18 via an external connection. The software 48 may be executable by the processing circuitry 42. The processing circuitry 42 may be configured to control any of the methods and/or processes described herein and/or to cause such methods, and/or processes to be performed, e.g., by receiver 18. Processor 44 corresponds to one or more processors 44 for performing receiver 18 functions described herein. The memory 46 is configured to store data, programmatic software code and/or other information described herein. In some embodiments, the software 48 may include instructions that, when executed by the processor 44 and/or processing circuitry 42, causes the processor 44 and/or processing circuitry 42 to perform the processes described herein with respect to receiver 18. For example, processing circuitry 42 of the receiver 18 may include phase adjustment unit 25 which is configured to perform one or more receiver 18 functions described herein such as with respect to phase/timing alignment of audio signals for speakers 14 and/or audio drivers 16 (e.g., based on configuration information received from calibration device 20), as disclosed herein.

Figure 2:
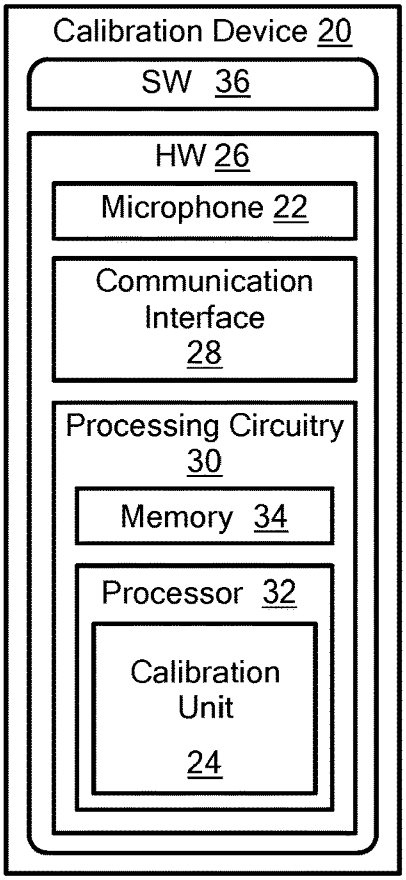
FIG. 2 is a diagram of a calibration device in the system according to some embodiments of the present disclosure.
Figure 3:
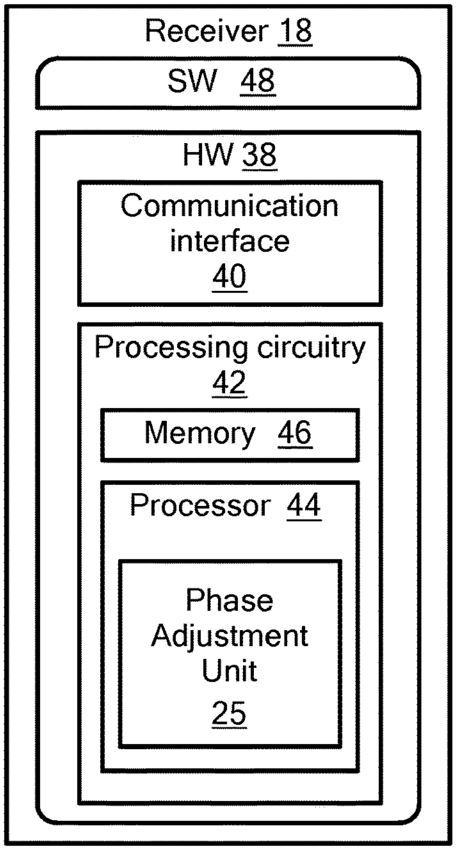
FIG. 3 is a diagram of a receiver in the system according to some embodiments of the present disclosure.

Although FIG. 2 and FIG. 3 show impulse response detection unit 24 and phase adjustment unit 25 as being within a respective processor, either unit may be implemented such that a portion of the unit is stored in a corresponding memory within the processing circuitry. In other words, the unit may be implemented in hardware or in a combination of hardware and software within the processing circuitry.

Figure 4:
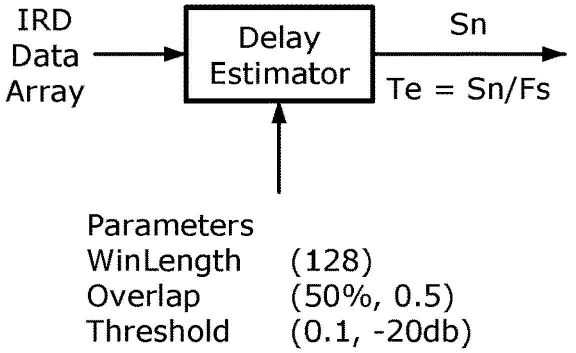
FIG. 4 is a diagram of an example phase estimation algorithm according to some embodiments of the present disclosure.

Embodiments of the present disclosure may provide methods, systems, and/or apparatuses for detecting phase characteristics (e.g., detecting a start time) of an impulse response. FIG. 4 is a block diagram illustrating an example delay estimator algorithm (e.g., performed by calibration device 20 and/or receiver 18) according to some embodiments of the present disclosure. In the illustrated example, microphone 22 captures impulse response data (IRD) by recording and/or sampling audio signals (e.g., output by speaker 14), where the audio signals correspond to an impulse signal (or other type of reference signal) output by speaker 14 (e.g., received from and/or generated by receiver 18 and/or calibration device 20). The IRD may correspond to an array of N data points. In some example embodiments, N=32768, but any arbitrary number of N samples may be used without deviating from the scope of the present disclosure as long as sufficient samples are captured in order to be able to have enough data points for analysis. The sampling period may be referred to as $T_s$, and $F_s$, the sampling rate, may correspond to the inverse of $T_s$. In the example of N=32768, the IRD time length may be 680 msec.

Referring still to FIG. 4, the output of the delay estimator algorithm (e.g., as determined by calibration device 20) corresponds to the estimated delay samples $S_n$, and the estimated delay time, $T_e$, may be calculated as $T_e=S_n*T_d$, where ideally $T_e=T_d$. In this example, the averaging window size is set to 128 samples, the averaging window overlap percentage is set to 50%, and the threshold is set to 0.1, −20 db. These parameters are merely examples, and other parameters may be used without deviating from the scope of the present disclosure.

Figure 5:
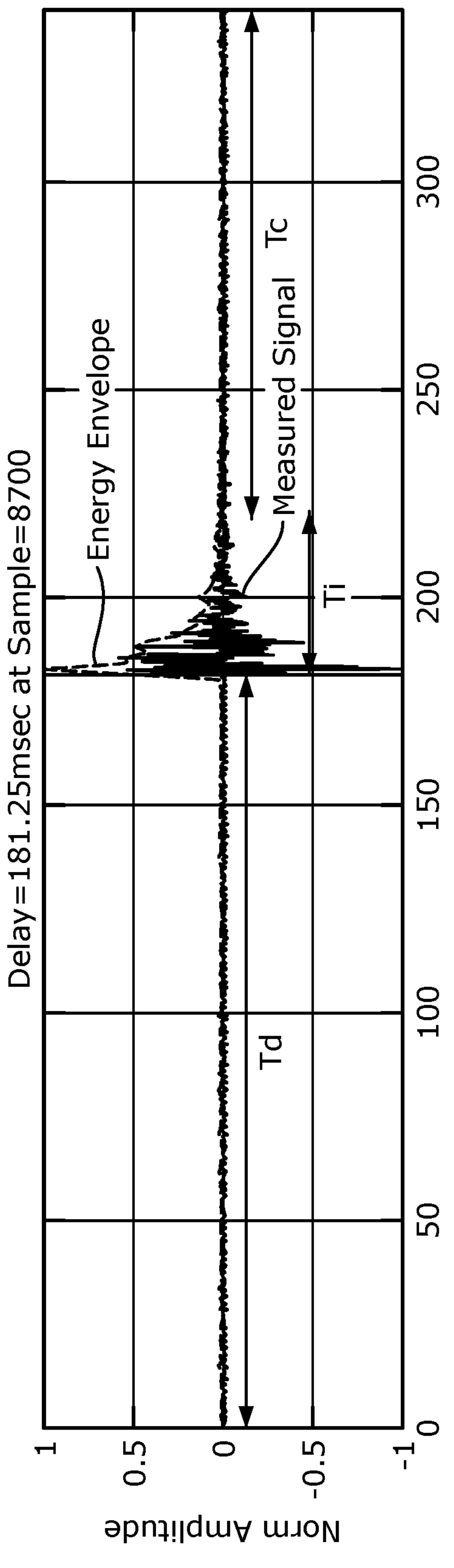
FIG. 5 is a graph illustrating an example impulse response measurement according to some embodiments of the present disclosure.

Referring to FIG. 5, which is a graph illustrating an example IRD measured by calibration device 20 for an impulse response, the signal may be divided into three time periods. In a first time period, the pre-excitation area $T_d$, the signal includes only noise (e.g., ambient noise of the listening environment 13, noise introduced by the audio signal channel and/or receiver 18, white Gaussian noise, etc.). The second time period, the Impulse Response area $T_i$, contains most of the impulse response signal energy (as well as noise). The third time period, the decay area $T_c$, contains diminishing energy plus noise. Thus, during the $T_d$ time period, most of the captured signal is noise. During the $T_i$ time period, most of the captured signal contains most of the system energy (i.e., the energy from the impulse response signal). During the $T_c$ time period, the captured signal is diminishing towards a noise level. An example energy envelope of the impulse response signal, as determined according to some embodiments of the present disclosure, is shown in FIG. 5 as well.

Figure 6:
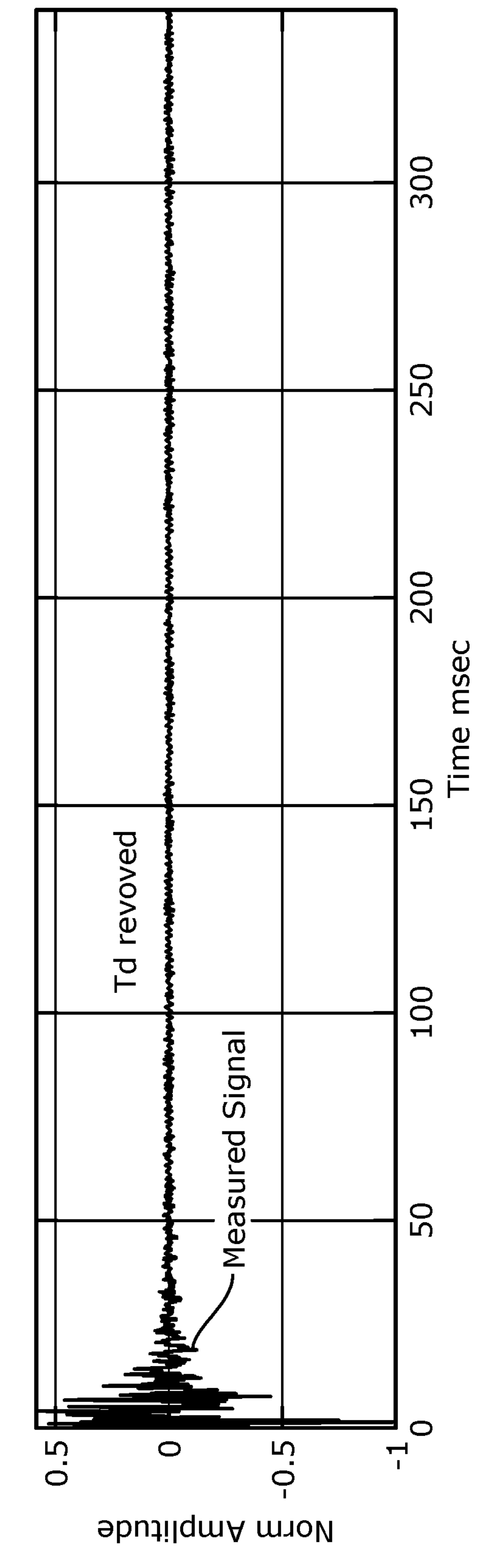
FIG. 6 is a graph illustrating the example impulse response of FIG. 5 with a delay time removed, according to some embodiments of the present disclosure.

FIG. 6 is a graph which illustrates the example of FIG. 5, in which the $T_d$ time period is removed by calibration device 20 (e.g., based at least in part on the algorithm described in the above paragraphs), such that the signal begins at the beginning of $T_i$.

In some embodiments of the present disclosure, calibration device 20 (e.g., via the impulse response detection unit 24) detects the start of the impulse response (e.g., the end of $T_d$ and the start of $T_i$) according to one or more of the following steps.

Calibration device 20 determines an energy envelope of the impulse response over at least a portion of the length of the measured signal (e.g., some or all of the time period(s) of the collected N samples, e.g., including $T_d$, $T_i$, and $T_c$).

Figure 7:
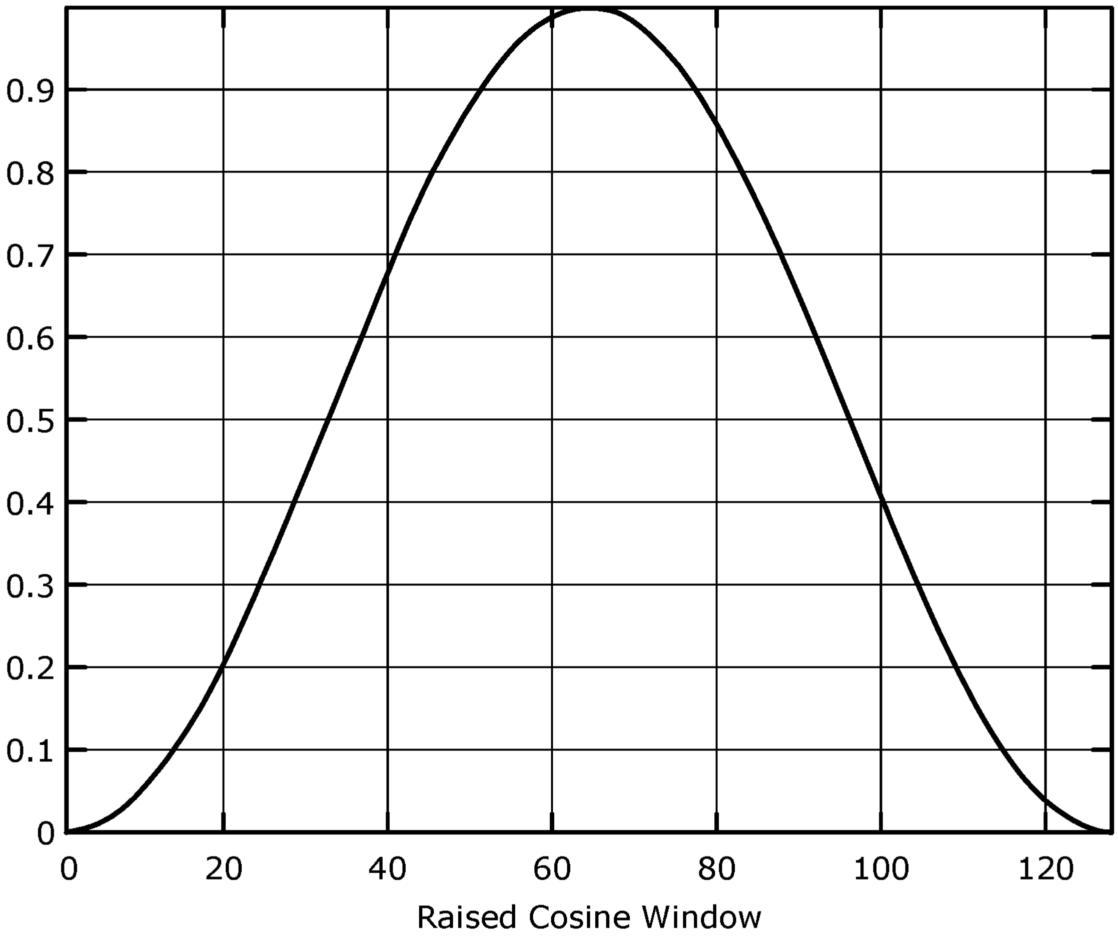
FIG. 7 is a graph illustrating an example raised cosine window, according to some embodiments of the present disclosure.

A variety of techniques may be employed for determining the energy envelope for the length of the measured signal. For example, in some embodiments, the energy envelope is determined by sliding an averaging window, such as a raised cosine window, over at least a portion of the length of the measured signal. For example, FIG. 7 is a graph illustrating an example raised cosine window according to some embodiments of the present disclosure. Calibration device 20 may slide the averaging window over some or all of the length of the impulse response (e.g., some or all of the time period(s) including $T_d$, $T_i$, and $T_c$), and may take the root mean square (RMS) value under this window, as illustrated in the example of FIG. 5, described above. Other averaging functions beside RMS may be used without deviating from the scope of the present disclosure.

In some embodiments, when calibration device 20 is determining the energy envelope of the impulse response signal, the averaging window may be continuously slid over the length of the impulse response signal (or a portion thereof). In some embodiments, the averaging window may be applied in discrete steps, which may be overlapping. The number of windowing steps may depend in part on the length of the IRD, the length of the window, and the overlapping percentage, as described above.

In some embodiments, at each windowing step (e.g., performed by calibration device 20), the window may be multiplied by the impulse response signal under the window, and the RMS value (or other averaging function output) may be calculated (e.g., by calibration device 20). Thus, several RMS points (or other averaging value points) equal to the number of the overlapping windowing operations may be calculated. As shown in FIG. 5, described above, the energy envelope of the IRD has been normalized (e.g., by calibration device 20) so that the maximum value is set to 1 (i.e., 0 dB). Thus, in this example, the noise level in decibels (dB) is referred to as 0 dB of the RMS peak value.

In some embodiments, a default size of the window may be 128 points, which calibration device 20 may slide over the IRD of a typical length of 32768 points. In this example, with a 50% overlap parameter, there will be approximately 512 RMS points forming the energy envelope. Other default parameters may be used without deviating from the scope of the present disclosure.

Thus, calibration device 20 may use the RMS envelope (or other averaging envelope) over time (i.e., over sample numbers or data points) to locate the energy envelope peak value, and a corresponding energy envelope peak time.

Figure 8:
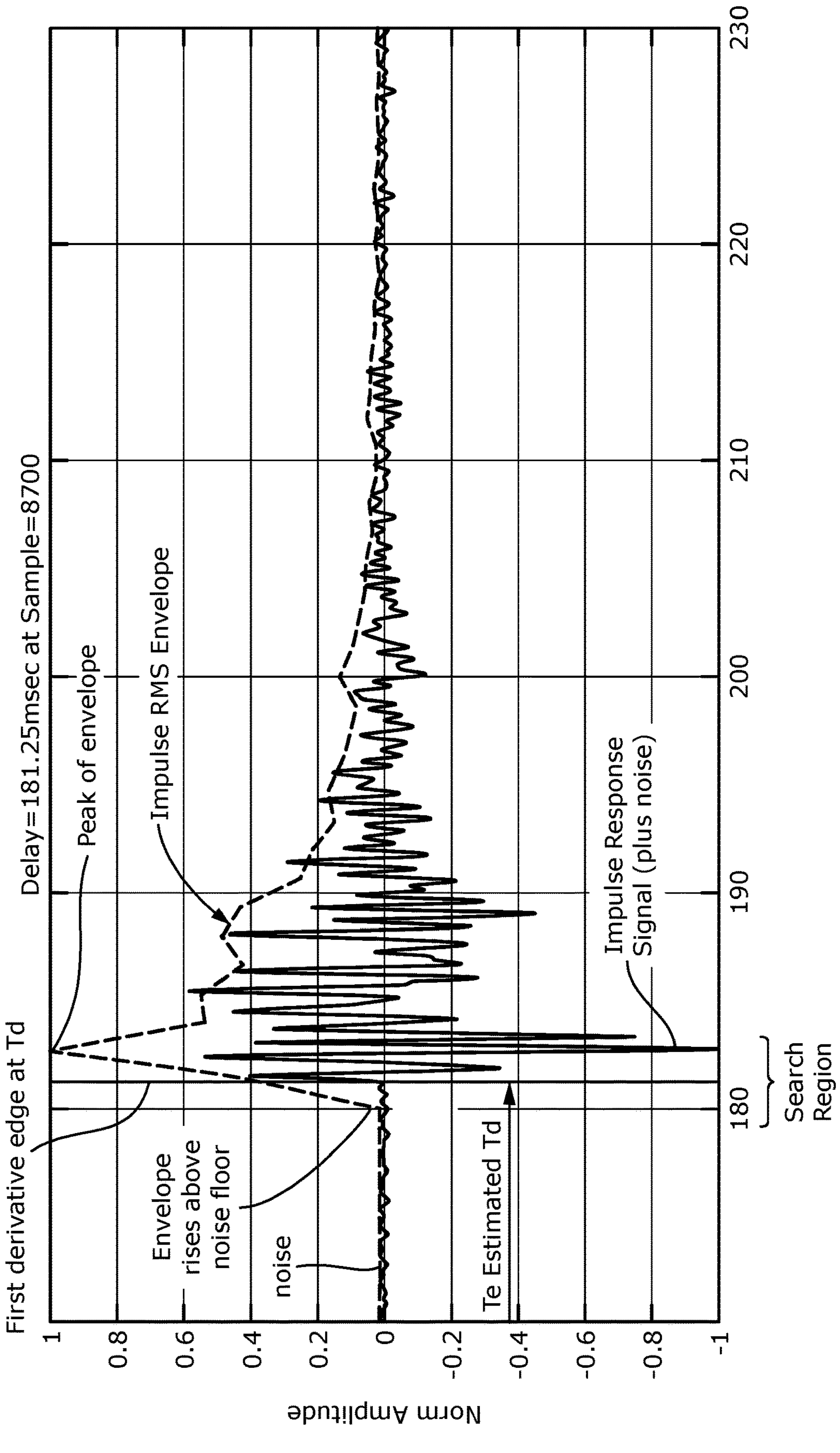
FIG. 8 is a graph illustrating an example impulse response signal with root mean squared envelope and estimated delay/start time calculated according to some embodiments of the present disclosure.

FIG. 8 is a graph which illustrates an example impulse response signal and RMS energy envelope calculated according to some embodiments of the present disclosure. The impulse RMS envelope, in the example of FIG. 8, may include a peak value, which indicates where the maximum energy of the impulsed system occurs in time. According to embodiments of the present disclosure, the section of interest in determining the delay may be in the period prior to the occurrence of this peak. This period is indicated as the "Search Region" in FIG. 8, which starts from the time that the energy envelope rises above the noise floor by a preconfigured threshold amount/value/percentage/etc., and ends at the energy envelope peak time. In the example of FIG. 8, the noise floor of the energy envelope is at least −20 dB below the noise floor of the measured impulse response. For example, in some embodiments, extracting the energy envelope may be an averaging process (e.g., a low-pass filtering), which may reduce the noise floor of the energy envelope by a significant amount.

The delay $T_d$ may be determined by searching in this Search Region, according to some embodiments of the present disclosure.

Determining $T_d$ in some embodiments may be described as a three-step procedure, although more or fewer steps may be used without deviating from the scope of the present disclosure.

Step 1. The calibration device 20 determines a point at which the energy envelope emerges above its noise floor, e.g., by a preconfigured threshold amount/value/percentage/etc. For example, calibration device 20 determines a derivative of the energy envelope from time 0 (and/or some arbitrary start time, e.g., a preconfigured amount after the start time of the impulse response, a reference time, etc.) up to the energy envelope peak time, as described above. The derivative may have its largest value (e.g., rate of change) just at the point where the energy envelope is emerging above its noise floor. This point corresponds to the start time of the Search Region.

Figure 9:
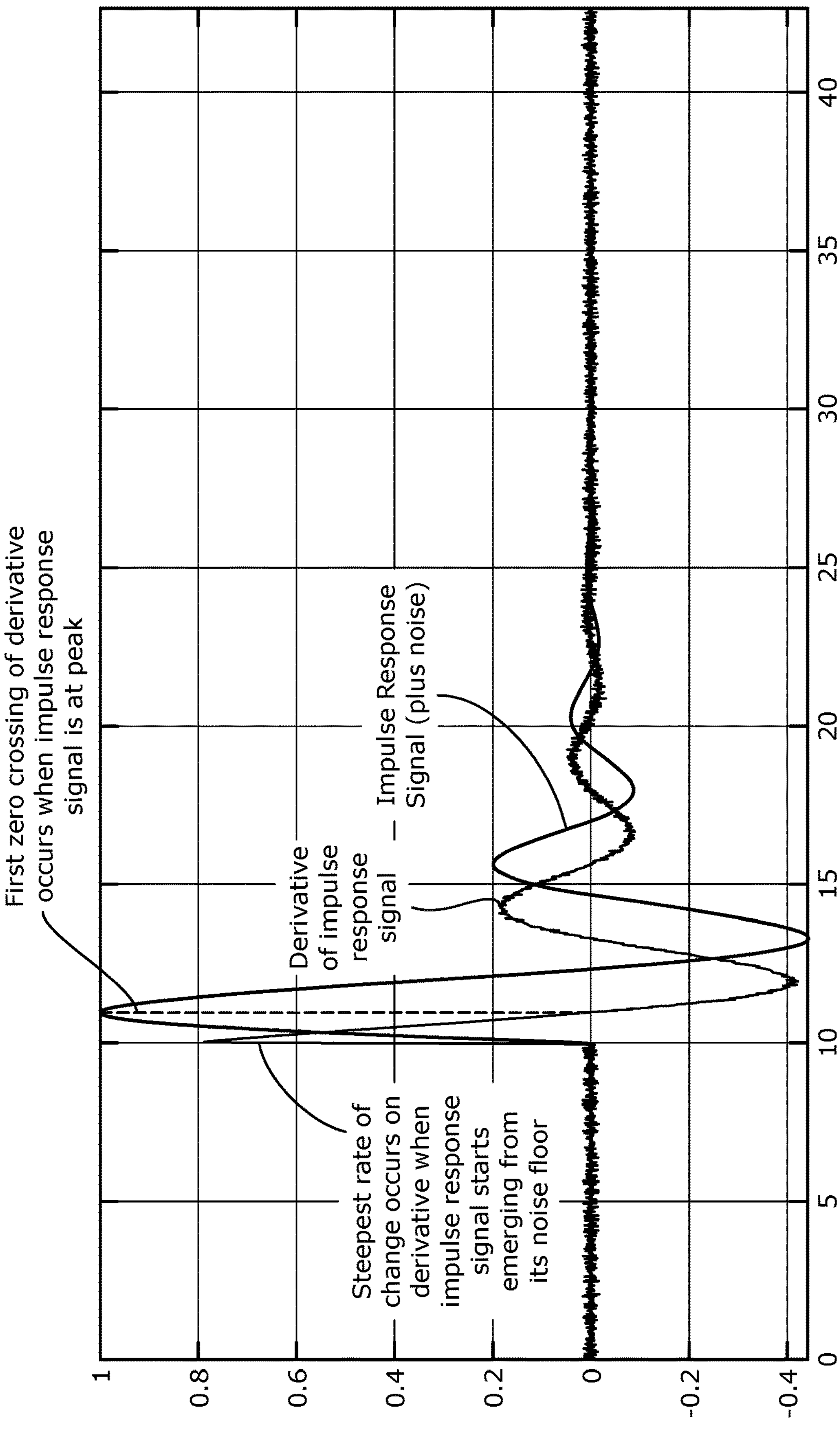
FIG. 9 is a graph illustrating an example impulse response signal and its derivative.

Step 2. In some embodiments, the calibration device 20 determines the first peak of the impulse response signal (i.e., the measured impulse response) in the Search Region. The calibration device 20 determines the derivative of the impulse response signal in the Search Region. The derivative crosses 0 at the first peak of the impulse response signal in the Search Region, and has maximum values on either side of this zero-crossing point. FIG. 9 illustrates an example of an impulse response with some noise and its derivative. In some embodiments, calibration device 20 determines the first zero crossing of the derivative, which in the example of FIG. 9, occurs when the measured impulse response signal (plus noise) is at its peak. Calibration device 20 determines the steepest (i.e., most rapid rate of change) occurs on the derivative when the impulse response signal starts emerging from its noise floor, as shown in the example of FIG. 9. These two time points may be determined by calibration device 20, and the delay time $T_d$ is determined to occur between these two time points.

Step 3. Referring to FIG. 8 and FIG. 9, in some embodiments, the time interval determined by calibration device 20 in Step 2 is a coarse estimate of the delay time $T_d$ (e.g., a halfway point between the two times determined in Step 2). The first time point from Step 2, T1 of the derivative of the energy envelope, corresponds to the time point as the energy envelope emerges from its noise floor (e.g., the steepest rate of change). The second time point from Step 2, T2, is determined from the derivative of the impulse response signal in FIG. 8, e.g., the time point as it emerges from its noise floor (e.g., the steepest rate of change). Both points lie to the left of the zero crossing point from FIG. 9, where T2>T1. The estimated delay $T_d$ may be determined by calibration device 20 to be a middle point, for example, between T1 and T2, minus a small delay $T_g$ inherent in the energy envelope due to the averaging process (i.e., the process for extracting the energy envelope). The delay $T_g$ may depend on the sliding window size and may be $0.5*N*T_s$ where N is the size of the window.

In some embodiments, calibration device 20 determines the derivative of the energy envelope and/or the derivative of the impulse response, which may both occur prior to the time of the energy envelope's peak value. Within the derivative data/window being considered, the calibration device 20 determines the maximum rate of change of the derivative, which may correspond to an indication that the signal has emerged from the noise floor. This first max-rate-of-change point may be determined by calibration device 20 as the target time point. The energy envelope derivative may be used to determined T1, and the impulse response derivative may be used to determined T2, as described above, where T2>T1. The actual time delay may be determined as a point within this time range (e.g., a midpoint). The "real" time delay determined by calibration device 20 may be, for example, the midpoint between T1 and T2, minus a small delay value due to the averaging window. This window allowance may be configured to compensate for the averaging that creates the envelope trace. This may make the actual $T_d$ slightly earlier than the midpoint of T1 and T2, for example. The "absolute" start time, $T_d$, however, may ultimately be obscured by noise, so the midpoint (or other value, e.g., the midpoint adjusted by $T_g$) lying between T1 and T2 is an approximation.

In some embodiments, the start time of the IRD period, $T_i$, may be determined by calibration device 20 to be at a time after the zero time (t=0) but before the peak time.

In some embodiments, from the start time (t=0) to the start of the impulse response (i.e., $T_d$), there is only noise in the signal. This noise is also windowed, as with the rest of the IRD, and the RMS value of the noise is at a very low level (in this example, at least −20 db below the peak 0 db RMS value). To accurately estimate/detect $T_d$, calibration device 20 may search within the IRD in at least the section marked "Search Region" in FIG. 8, and may detect the first edge of the derivative of the IRD in the Search Region. The first derivative edge is detected/recorded by calibration device 20 at the $T_d$, as shown in FIG. 8.

Thus, by calculating the first derivative edge as described above according to some embodiments of the present disclosure, calibration device 20 may determine $T_d$. Calibration device 20 may indicate $T_d$ to receiver 18, and/or may further calculate one or more phase adjustment/timing values based on $T_d$, and may indicate such values to receiver 18. Receiver 18 may adjust the timing and/or phase of one or more speaker 14 audio channels based on $T_d$ and/or the adjustment/timing values received from calibration device 20.

Figure 10:
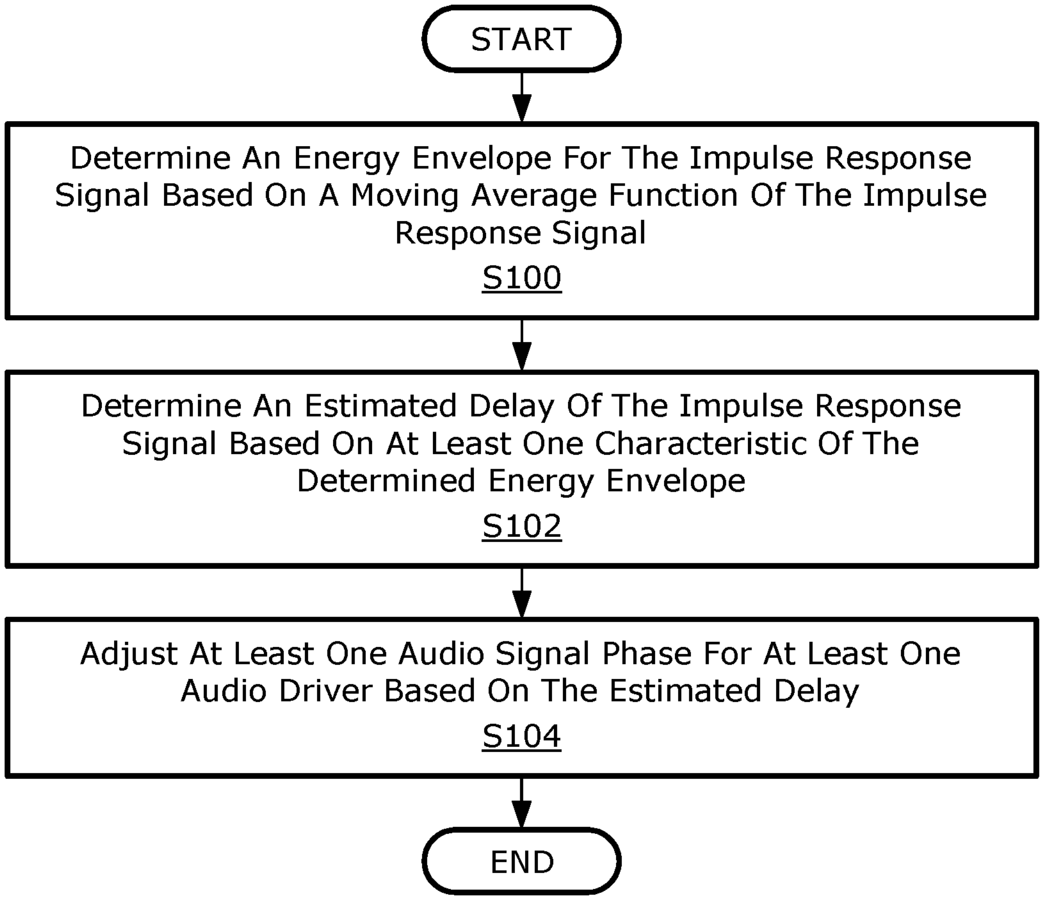
FIG. 10 is a flowchart of an example process in the calibration device according to some embodiments of the present disclosure.

FIG. 10 is a flowchart of an example in a calibration device 20 according to one or more embodiments of the present invention. One or more blocks described herein may be performed by one or more elements of calibration device 20 such as by one or more of microphone 22, communication interface 28, processing circuitry 30 (including the impulse response detection unit 24), processor 32, etc. In some embodiments, one or more blocks described herein may alternatively and/or additionally be performed by one or more elements of receiver 18 such as by one or more of communication interface 40, processing circuitry 42 (including the phase adjustment unit 25), processor 44, etc. Calibration device 20 configured to determine (Block S100) an energy envelope for the impulse response signal based on a moving average function of the impulse response signal. For example, the impulse response signal may be generated and/or received by receiver 18, and may be output on one or more speakers 14 and/or audio drivers 16. In some embodiments, calibration device 20 may instruct and/or configure receiver 18 to output a particular impulse signal and/or impulse response signal, which may be signaled by calibration device 20 to receiver 18, and/or may be generated by receiver 18, e.g., based on a preconfigured impulse response signal. Calibration device 20 is further configured to determine (Block S102) an estimated delay of the impulse response signal based on at least one characteristic of the determined energy envelope. Calibration device 20 is further configured to adjust (Block S104) at least one audio signal phase for at least one audio driver based on the estimated delay. For example, the estimated delay may be used by receiver 18 and/or calibration device 20 to adjust one or more characteristics (e.g., phase, timing, etc.) of audio channels played on speakers 14 associated with the measured impulse response.

In some embodiments, the at least one characteristic includes at least one of a peak value of the energy envelope, and a peak time at which the energy envelope first reaches the peak value. In some embodiments, determining the estimated delay time includes determining a noise floor of the impulse response signal, determining a first time at which an amplitude of the impulse response signal rises to a threshold value above the noise floor, the threshold value being a predetermined fraction of the peak value of the energy envelope, and detecting a first edge (inflection point) of a derivative of the impulse response signal in a time period from the first time to the peak time, the estimated delay time being an amount of time from a start time to the detected first edge (inflection point). In some embodiments, there may be different threshold values associated with different frequency ranges of various loudspeakers 14. For example, a subwoofer 14*a* for a first frequency range may be associated with a first threshold value (e.g., 1/10), whereas a midbass 14*b* for a second frequency range may be associated with a second threshold value (e.g., 2/10). Other values may be used for a variety of speakers 14 and corresponding frequency ranges, so as to optimize impulse response detection for particular speakers, which may vary in noise characteristics, for instance.

In some embodiments the predetermined fraction is one-tenth. In some embodiments, the calibration device 20 is further configured to generate a reference audio signal for playback on a loudspeaker 14 (e.g., via receiver 18), and measure the playback of the loudspeaker 14 to determine the impulse response (e.g., a collection of N samples of measurements of the impulse response), the start time being associated with the generating of the reference audio signal.

In some embodiments, the moving average function is based on a root mean squared function. In some embodiments, the moving average function is further based on a raised cosine window.

Figure 11:
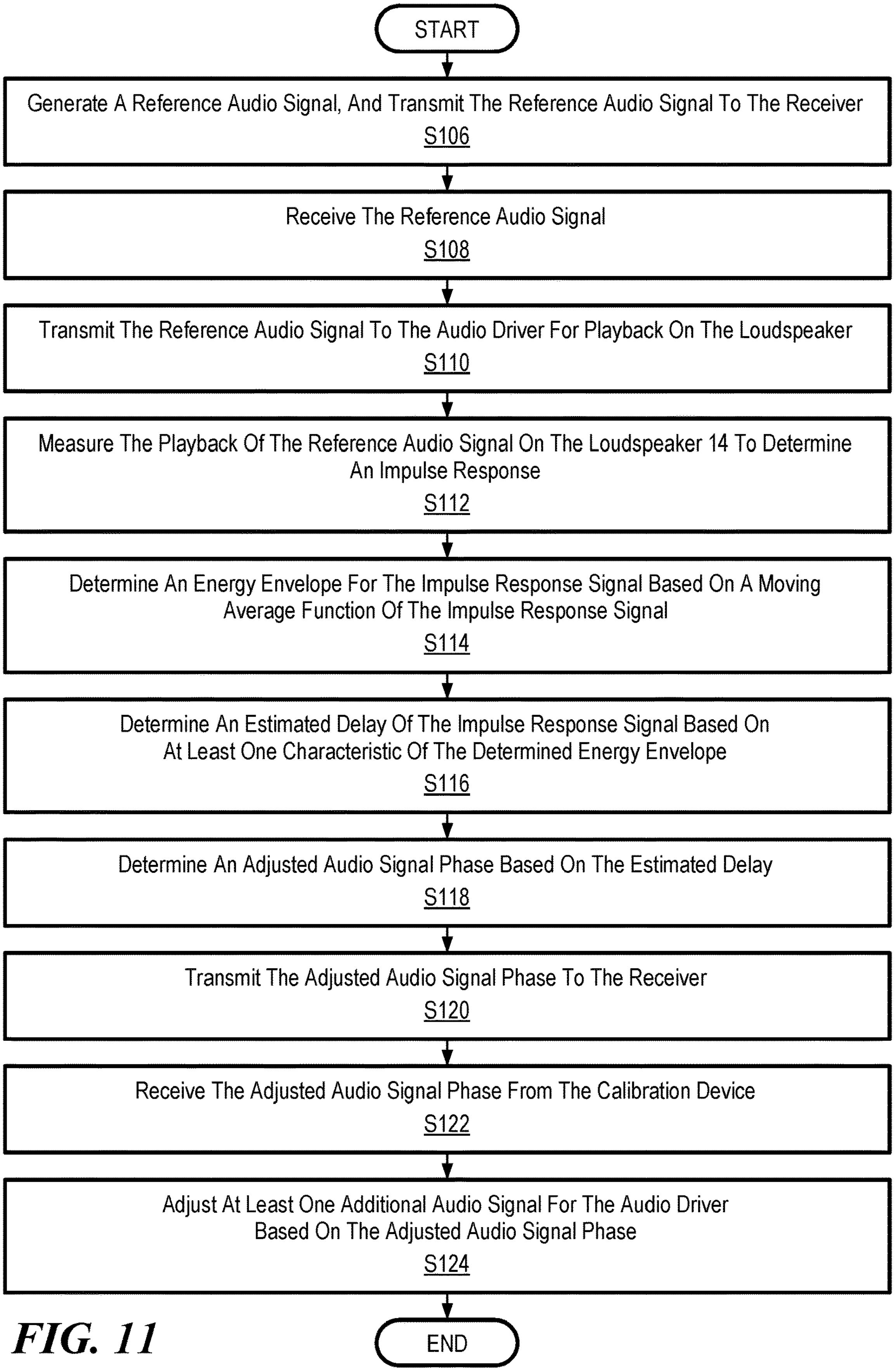
FIG. 11 is a flowchart of another example process in a system including a calibration device, receiver, audio driver, and loudspeaker, according to some embodiments of the present disclosure.

FIG. 11 is a flowchart of an example in a system 10 including a calibration device 20, receiver 18, audio driver 16, and loudspeaker 14. One or more blocks described herein may be performed by one or more elements of calibration device 20 such as by one or more of microphone 22, communication interface 28, processing circuitry 30 (including the impulse response detection unit 24), processor 32, etc. One or more blocks described herein may be performed by one or more elements of receiver 18 such as by one or more of communication interface 40, processing circuitry 42 (including the phase adjustment unit 25), processor 44, etc.

The calibration device 20 is configured to generate (Block S106) a reference audio signal, and transmit the reference audio signal to the receiver 18. The receiver 18 is configured to receive (Block S108) the reference audio signal, and transmit (Block S110) the reference audio signal to the audio driver 16 for playback on the loudspeaker 14. The calibration device 20 is further configured to measure (Block S112) the playback of the reference audio signal on the loudspeaker 14 to determine an impulse response, determine (Block S114) an energy envelope for the impulse response signal based on a moving average function of the impulse response signal, determine (Block S116) an estimated delay of the impulse response signal based on at least one characteristic of the determined energy envelope, determine (Block S118) an adjusted audio signal phase based on the estimated delay, and transmit (Block S120) the adjusted audio signal phase to the receiver 18. The receiver 18 is further configured to receive (Block S122) the adjusted audio signal phase from the calibration device 20, and adjust (Block S124) at least one additional audio signal for the audio driver 16 based on the adjusted audio signal phase.

According to one or more embodiments of this aspect, the at least one characteristic includes at least one of a peak value of the energy envelope, and a peak time at which the energy envelope first reaches the peak value.

According to one or more embodiments of this aspect, the calibration device 20 is configured to determine the estimated delay time by determining a noise floor of the impulse response signal, determining a first time at which an amplitude of the impulse response signal rises to a threshold value above the noise floor, the threshold value being a predetermined fraction of the peak value of the energy envelope, and detecting a first inflection point of a derivative of the impulse response signal in a time period from the first time to the peak time, the estimated delay time being an amount of time from a start time to the detected first inflection point.

According to one or more embodiments of this aspect, the predetermined fraction is one-tenth.

According to one or more embodiments of this aspect, the start time is associated with the generating of the reference audio signal.

According to one or more embodiments of this aspect, the moving average function is based on a root mean squared function.

SOME EXAMPLES

Example A1. A method for delay estimation of audio signals using an impulse response signal, the method comprising:

- determining an energy envelope for the impulse response signal based on a moving average function of the impulse response signal;
- determining an estimated delay of the impulse response signal based on at least one characteristic of the determined energy envelope; and
- adjusting at least one audio signal phase for at least one audio driver 16 based on the estimated delay.

Example A2. The method of Example A1, wherein the at least one characteristic includes at least one of:

- a peak value of the energy envelope; and
- a peak time at which the energy envelope first reaches the peak value.

Example A3. The method of Example A2, wherein determining the estimated delay time includes:

- determining a noise floor of the impulse response signal;
- determining a first time at which an amplitude of the impulse response signal rises to a threshold value above the noise floor, the threshold value being a predetermined fraction of the peak value of the energy envelope; and
- detecting a first edge of a derivative of the impulse response signal in a time period from the first time to the peak time, the estimated delay time being an amount of time from a start time to the detected first edge.

Example A5. The method of Example A3, wherein the predetermined fraction is one-tenth.

Example A5. The method of any one of Examples A3 and A4, wherein the method further comprises:

- generating a reference audio signal for playback on a loudspeaker 14; and
- measuring the playback of the loudspeaker 14 to determine the impulse response, the start time being associated with the generating of the reference audio signal.

Example A6. The method of any one of Examples A1-A5, wherein the moving average function is a root mean squared function.

Example B1. A calibration device 20 for delay estimation of audio signals using an impulse response signal, the calibration device 20 comprising processing circuitry 30 configured to:

- determine an energy envelope for the impulse response signal based on a moving average function of the impulse response signal;
- determine an estimated delay of the impulse response signal based on at least one characteristic of the determined energy envelope; and
- adjust at least one audio signal phase for at least one audio driver 16 based on the estimated delay.

Example B2. The calibration device of Example B1, wherein the at least one characteristic includes at least one of:

- a peak value of the energy envelope; and a peak time at which the energy envelope first reaches the peak value.

Example B3. The calibration device 20 of any one of Examples B1 and B2, wherein determining the estimated delay time includes:

determining a noise floor of the impulse response signal;

determining a first time at which an amplitude of the impulse response signal rises to a threshold value above the noise floor, the threshold value being a predetermined fraction of the peak value of the energy envelope; and detecting a first edge of a derivative of the impulse response signal in a time period from the first time to the peak time, the estimated delay time being an amount of time from a start time to the detected first edge.

Example B4. The calibration device 20 of any one of Examples B1-B3, wherein the predetermined fraction is one-tenth.

Example B5. The calibration device 20 of any one of Examples B3 and B4, wherein the processing circuitry 30 is further configured to:

generate a reference audio signal for playback on a loudspeaker 14; and measure the playback of the loudspeaker 14 to determine the impulse response, the start time being associated with the generating of the reference audio signal.

Example B6. The calibration device 20 of any one of Examples B1-B5, wherein the moving average function is a root mean squared function.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings and the following claims.

What is claimed is:

1. A calibration device for delay estimation of audio signals using an impulse response signal, the calibration device comprising processing circuitry configured to:

determine an energy envelope for the impulse response signal based on a moving average function of the impulse response signal;

determine an estimated delay of the impulse response signal based on at least one characteristic of the determined energy envelope, wherein the at least one characteristic includes at least one of:

a peak value of the energy envelope; and a peak time at which the energy envelope first reaches the peak value; and adjust at least one audio signal phase for at least one audio driver based on the estimated delay, wherein the processing circuitry is further configured to determine the estimated delay time by:

determining a noise floor of the impulse response signal;

determining a first time at which an amplitude of the impulse response signal rises to a threshold value above the noise floor, the threshold value being a predetermined fraction of the peak value of the energy envelope; and detecting a first inflection point of a derivative of the impulse response signal in a time period from the first time to the peak time, the estimated delay time being an amount of time from a start time to the detected first inflection point.

2. The calibration device of claim 1, wherein the predetermined fraction is one-tenth.

3. The calibration device of claim 1, wherein the processing circuitry is further configured to:

generate a reference audio signal for playback on a loudspeaker; and measure the playback of the loudspeaker to determine the impulse response, the start time being associated with the generating of the reference audio signal.

4. A calibration device for delay estimation of audio signals using an impulse response signal, the calibration device comprising processing circuitry configured to:

determine an energy envelope for the impulse response signal based on a moving average function of the impulse response signal;

determine an estimated delay of the impulse response signal based on at least one characteristic of the determined energy envelope; and adjust at least one audio signal phase for at least one audio driver based on the estimated delay;

wherein the moving average function is based on a root mean squared function.

5. The calibration device of claim 4, wherein the moving average function is further based on a raised cosine window.

6. A system for delay estimation of audio signals, the system comprising a calibration device, a receiver, a loudspeaker, and an audio driver, wherein:

the calibration device comprises processing circuitry configured to:

generate a reference audio signal; and cause transmission of the reference audio signal to the receiver;

the receiver comprising processing circuitry configured to:

receive the reference audio signal; and cause transmission of the reference audio signal to the audio driver for playback on the loudspeaker;

the processing circuitry of the calibration device being further configured to:

measure the playback of the reference audio signal on the loudspeaker to determine an impulse response;

determine an energy envelope for the impulse response signal based on a moving average function of the impulse response signal;

determine an estimated delay of the impulse response signal based on at least one characteristic of the determined energy envelope;

determine an adjusted audio signal phase based on the estimated delay; and cause transmission of the adjusted audio signal phase to the receiver; and the processing circuitry of the receiver being further configured to:

receive the adjusted audio signal phase from the calibration device; and adjust at least one additional audio signal for the audio driver based on the adjusted audio signal phase;

wherein the processing circuitry of the calibration device is configured to determine the estimated delay time by:

determining a noise floor of the impulse response signal;

determining a first time at which an amplitude of the impulse response signal rises to a threshold value above the noise floor, the threshold value being a predetermined fraction of the peak value of the energy envelope; and detecting a first inflection point of a derivative of the impulse response signal in a time period from the first time to the peak time, the estimated delay time being an amount of time from a start time to the detected first inflection point.

7. The system of claim 6 wherein the predetermined fraction is one-tenth.

8. The system of claim 6, wherein the start time is associated with the generating of the reference audio signal.

9. A system for delay estimation of audio signals, the system comprising a calibration device, a receiver, a loudspeaker, and an audio driver, wherein:

the calibration device comprises processing circuitry configured to:

generate a reference audio signal; and cause transmission of the reference audio signal to the receiver;

the receiver comprising processing circuitry configured to:

receive the reference audio signal; and cause transmission of the reference audio signal to the audio driver for playback on the loudspeaker;

the processing circuitry of the calibration device being further configured to:

measure the playback of the reference audio signal on the loudspeaker to determine an impulse response;

determine an energy envelope for the impulse response signal based on a moving average function of the impulse response signal;

determine an estimated delay of the impulse response signal based on at least one characteristic of the determined energy envelope;

determine an adjusted audio signal phase based on the estimated delay; and cause transmission of the adjusted audio signal phase to the receiver; and the processing circuitry of the receiver being further configured to:

receive the adjusted audio signal phase from the calibration device; and adjust at least one additional audio signal for the audio driver based on the adjusted audio signal phase;

wherein the moving average function is based on a root mean squared function.

* * * * *